(12) United States Patent
Tanaka et al.

(10) Patent No.: US 6,640,254 B1
(45) Date of Patent: Oct. 28, 2003

(54) NETWORK CONTROL DEVICE ENABLING COMMUNICATION BETWEEN FIRST AND SECOND NETWORKS UTILIZING MODE SWITCHING FOR DOWNLOADING A COMMUNICATION PROGRAM TO THE SECOND NETWORK

(75) Inventors: Satoshi Tanaka, Shizuoka-ken (JP); Katsutoshi Nakajima, Shizuoka-ken (JP); Akira Norizuki, Shizuoka-ken (JP)

(73) Assignee: Yazaki Corporation, Tokyo (JP)

( * ) Notice: Subject to any disclaimer, the term of this patent is extended or adjusted under 35 U.S.C. 154(b) by 636 days.

(21) Appl. No.: 09/619,575

(22) Filed: Jul. 19, 2000

(30) Foreign Application Priority Data

Aug. 6, 1999 (JP) .......................................... 11-224316

(51) Int. Cl.[7] ............................................... G06F 15/16
(52) U.S. Cl. ....................... 709/249; 709/217; 709/218; 709/250
(58) Field of Search ................................ 709/249, 250, 709/217, 218

(56) References Cited

U.S. PATENT DOCUMENTS 5,428,555 A * 6/1995 Starkey et al. .............. 700/275
6,006,141 A * 12/1999 Yoneda et al. .............. 700/169
6,070,000 A * 5/2000 Mori .......................... 358/1.15
6,205,486 B1 * 3/2001 Wei et al. ................... 709/233
6,563,793 B1 * 5/2003 Golden et al. .............. 370/236

FOREIGN PATENT DOCUMENTS

| JP | 7-46665 | 2/1995 |
| JP | 7-95659 | 4/1995 |

* cited by examiner

*Primary Examiner*—Nabil El-Hady
(74) *Attorney, Agent, or Firm*—Oblon, Spivak, McClelland, Maier & Neustadt, P.C.

(57) ABSTRACT

There is provided a network control device including: network control unit for controlling a communication process in a first network system; a serial interface for controlling a serial communication process between the first network system and a second network system; and initializing unit for updating a communication program of the second network system, wherein the initializing unit has mode switching unit for switching changeable/unchangeable of the communication program of the second network system, and program download unit for transmitting the communication program to the second network system. According to this device, without using a device having a conventional gateway function and changing a conventional device at all, a new different network system is added to a conventional network system such as an in-vehicle network system, so that the network system can be extended.

16 Claims, 4 Drawing Sheets

NETWORK CONTROL DEVICE ENABLING COMMUNICATION BETWEEN FIRST AND SECOND NETWORKS UTILIZING MODE SWITCHING FOR DOWNLOADING A COMMUNICATION PROGRAM TO THE SECOND NETWORK

BACKGROUND OF THE INVENTION

1. Field of the Invention

The present invention relates to a network control device used when a new different network system is connected to a conventional network system to extend the network system and, more particularly, to a technique for realizing space saving of a network system and reductions in cost and effort required for constructing the network system.

2. Description of the Related Art

Conventionally, when a new different network system B such as a high-speed digital network system constituted by a plurality of digital devices each having high-speed LAN interfaces is additionally connected to a conventional network system A such as an in-vehicle network system constituted by a plurality of analog devices each having a low-speed LAN (Local Area Network) interface, a device (network control device) having a gateway function is generally interposed between the networks A and B to control communication between the networks A and B (see Japanese Patent Application Laid-Open No. 7-95659).

However, when a network system is extended by a conventional method, a new device used for only communication between networks is added to the network system. For this reason, the scale of the network system is enlarged, and it is very difficult to realize space saving of the network system as a whole.

In addition, when the network system is extended, a new device used for only communication is added to increase a cost required for constructing the network system and to increase the number of steps in design. Some change and addition must be performed to a conventional device, disadvantageously.

SUMMARY OF THE INVENTION

The present invention has been made in consideration of the above-mentioned technical problems, and has as its object to provide a network system control device for realizing space saving of a network system and reductions in cost and effort required for constructing the network system.

In order to achieve the object, as a characteristic feature of the present invention, there is provided a network control device comprising: network control unit for controlling a communication process in a first network system; a serial interface for controlling a serial communication process between the first network system and a second network system; and initializing unit for updating a communication program of the second network system, wherein the initializing unit has mode switching unit for switching changeable/unchangeable of the communication program of the second network system, and program download unit for transmitting the communication program to the second network system.

According to the embodiment of the present invention, a new different network system is added to a conventional network system such as an in-vehicle network system without using a device having a conventional gateway function and without changing a conventional device at all, so that the network system can be extended. For this reason, space saving of the network system and a reduction in cost required for constructing the network system can be realized. In addition, the network control device may have only a simple serial interface and need not have an interface related to a conventional network, so that the software related to network control can be easily designed. In addition, since all the device on the network system can be operated by transmitting/receiving a simple command using serial communication, an extending operation for the network system can be easily performed.

The network control device has a function included in the present invention, so that communication between different networks may be realized while saving the space.

In this manner, since a device having a gateway function need not be added when a network is constructed, the network can be easily extended while extending the scale of the network.

The network control device has a function included in the present invention, so that communication between different networks may be realized without changing a conventional device at all.

In this manner, since a conventional device need not be changed when a network is constructed, a cost required for constructing the network system and the number of steps in design can be considerably reduced.

Other and further objects and features of the present invention will become obvious upon understanding of the illustrative embodiments about to be described in connection with the accompanying drawings or will be indicated in the appended claims, and various advantages not refered to herein will occur to one skilled in the art upon employing of the invention in practice.

DETAILED DESCRIPTION OF THE PREFERRED EMBODIMENTS

Figure 1:
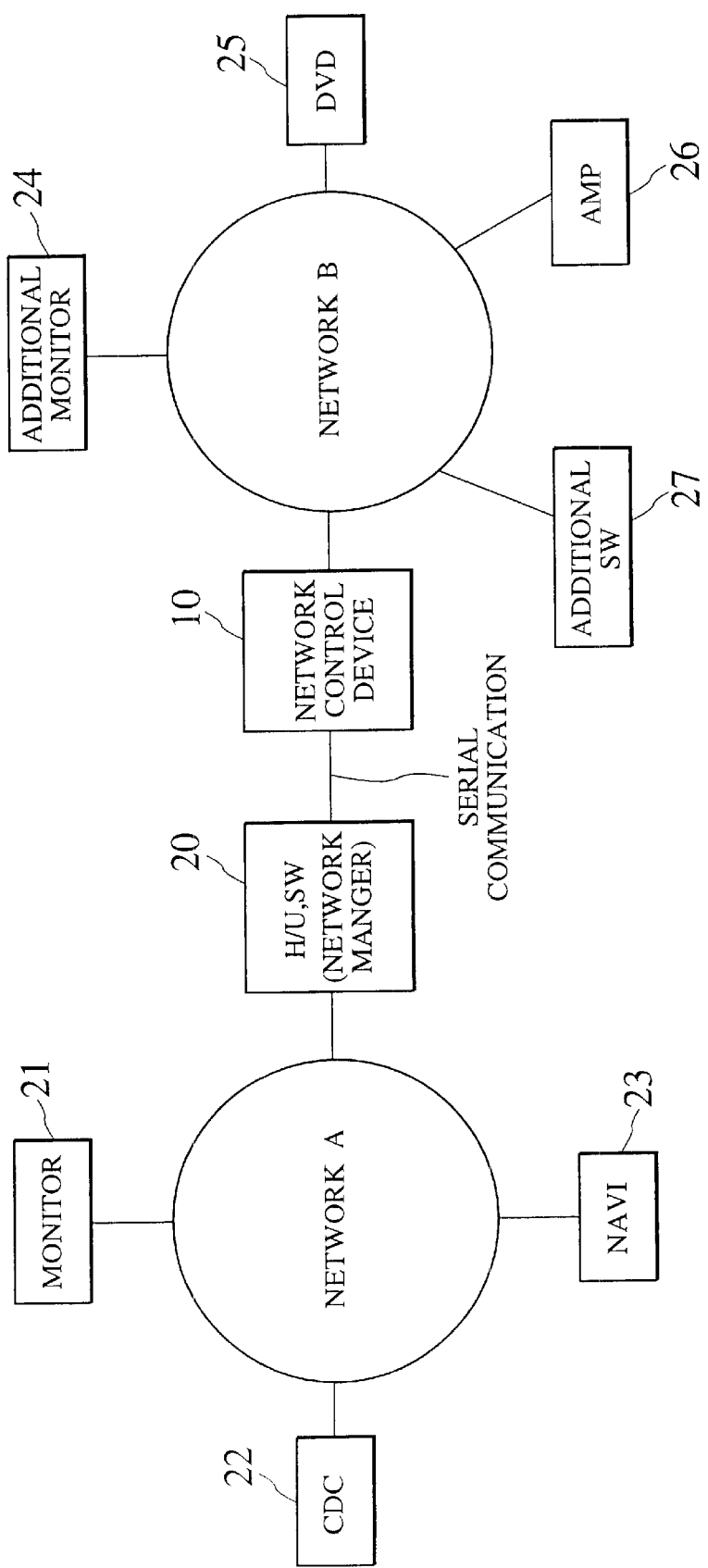
FIG. 1 is a diagram showing a configuration of a network control device according to an embodiment of the present invention.

Various embodiments of the present invention will be described with reference to the accompanying drawings. It is to be noted that the same or similar reference numerals are applied to the same or similar parts and elements throughout the drawings, and the description of the same or similar parts and elements will be omitted or simplified.

A network control device according to an embodiment of the present invention will be described below with reference to FIGS. 1 to 4.

Figure 2:
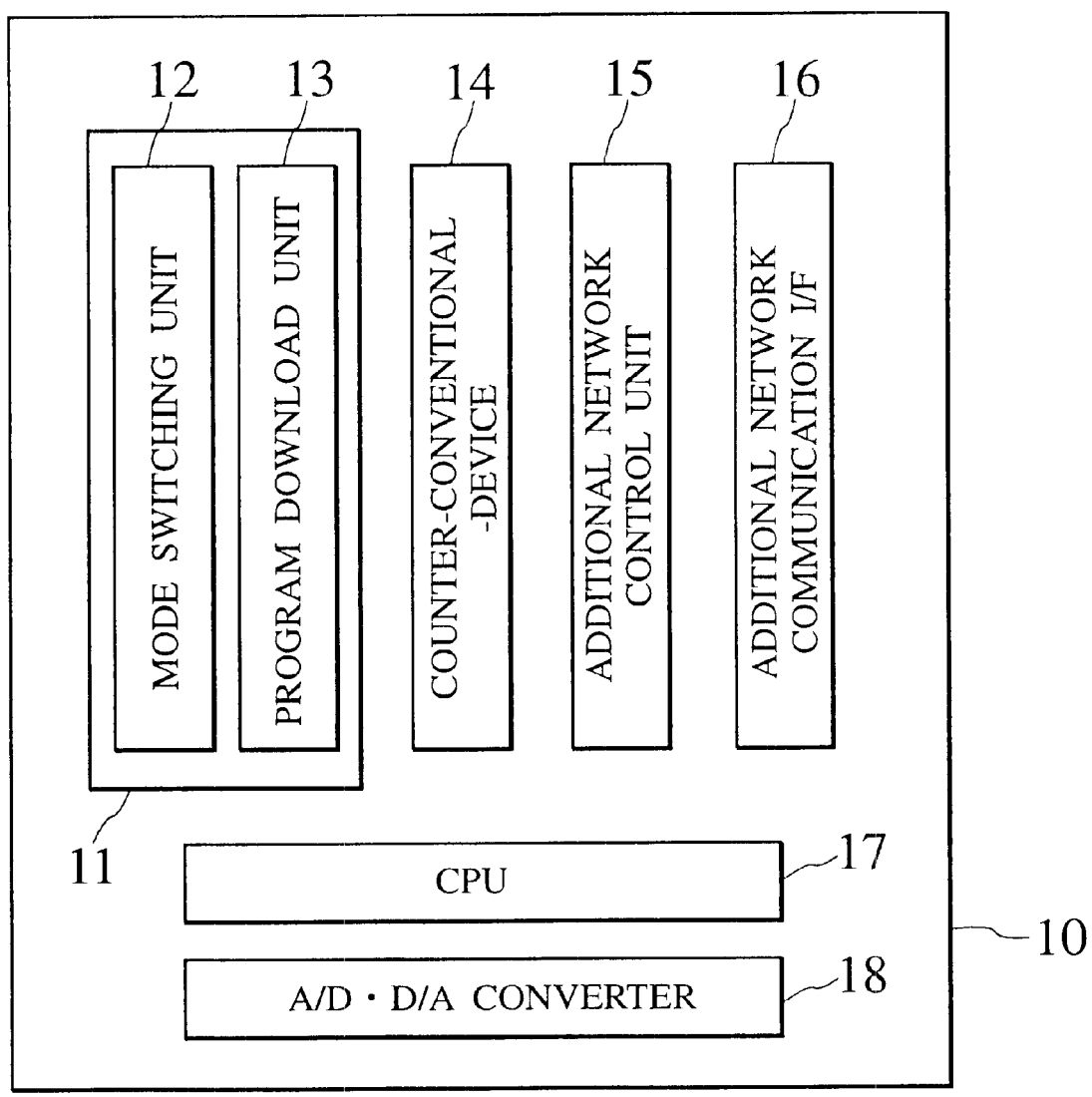
FIG. 2 is a diagram showing a configuration of the network control device according to the embodiment of the present invention.

As shown in FIG. 1, a network control device 10 according to the embodiment of the present invention is arranged in a network system B to be added. As shown in FIG. 2, the network control device 10 comprises an initializing unit 11 for updating the contents of a communication program of a network system A, a counter-conventional-device serial interface (I/F) 14 for performing serial communication with the network system A, an additional network control unit 15 for controlling a communication process to the network system B, an additional network communication interface 16 for controlling an inputting/outputting operation of a signal from the network system B, a CPU 17 for controlling the operations of constituent elements in the network control device 10, and an A/D and D/A converter 18 for performing analog/digital (A/D) and digital/analog (D/A) conversion processes of communication information.

Here, the initializing unit 11 has at least a mode switching unit 12 for switching a program updating mode of the network system A and a program download unit 13 for downloading a communication program in the network system A.

In this manner, according to the network control device 10 of the embodiment of the present invention, when only the network control device of the embodiment of the present invention is connected to a conventional device (e.g., a network manager or the like) 20 having "general-purpose operation and drawing function" and a "serial interface" in the conventional network system A, transmission operation information and drawing information from the device on the additional network system B to the device 20 and reception of the operation information and the drawing information from the device on the network system A onto the network system B through the device 20 can be performed. In this case, the "general-purpose operation and drawing function" are an interface for transmitting/receiving commands of an operation and drawing between the devices on the conventional network system A and a communication program, and the "general-purpose serial interface" indicates a simple serial interface such as a UART for updating the contents of a program.

In this case, as devices on the conventional network system A, a monitor device 21, a CDC device 22, a navigation (NAVI) device 23, and the like are used. As devices on the additional network system B, a monitor device 24, a DVD (Digital Video Disc) device 25, an amplifier (AMP) device 26, a switching (SW) device 27, and the like are used. Therefore, when the network control device 10 of the embodiment of the present invention is connected to the conventional device 20 having the general-purpose operation and the drawing function and the serial interface, without changing the conventional device 20 at all, by only transmission and reception of a simple command using serial communication, the following operations can be easily performed. That is, an audio source of the CDC device 22 on the conventional network system A is heard through the amplifier device 26 on the additional network system B, and the devices on the conventional network system A are operated by the switching device 27 on the additional network system B.

A function (additional operation or new screen) with which the general-purpose operation and the drawing function cannot cope can be achieved by downloading an additional program from the network control device 10 of the embodiment of the present invention into the conventional network or directly inputting a screen.

In addition, when the network control device 10 of the embodiment of the present invention has the drawing function, data received from a device on the conventional network system A can also be displayed on the screen of the monitor on the additional network system B.

Figure 3:
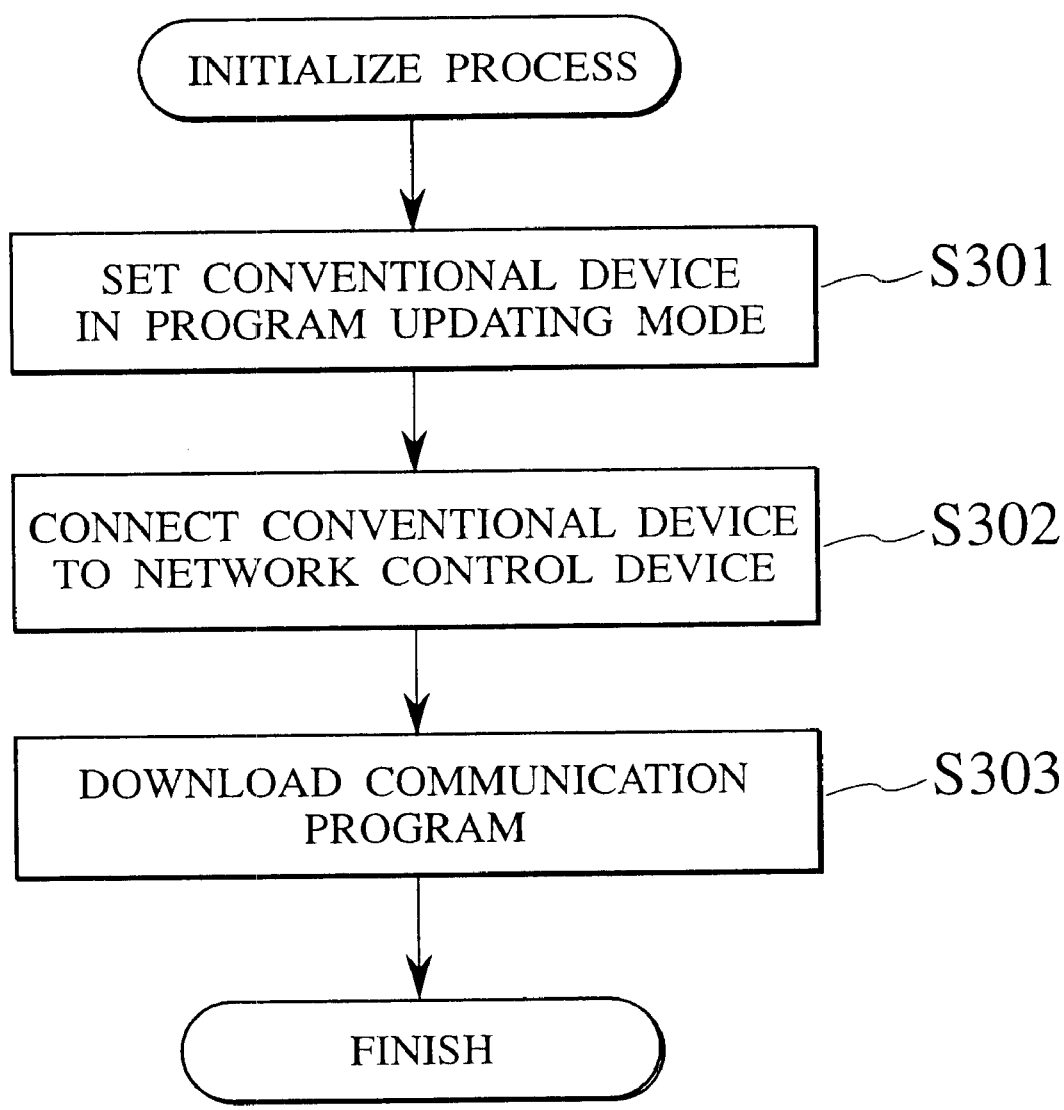
FIG. 3 is a flow chart showing a method of extending a network using the network control device according to the embodiment of the present invention.

In this case, connection of the network control device 10 of the embodiment of the present invention to the conventional device 20 in the conventional network system A is performed, as shown in FIG. 3, by the following steps.

(1) First, the conventional device 20 is set in a program updating mode(mode switching step, S301).
(2) The conventional device 20 and the network control device 10 are connected to each other(connection step, S302).
(3) Subsequently, an inter-network communication program is downloaded from the network control device 10 into the conventional device 20(downloading step, S303).

In this manner, without minimally changing the conventional device 20 or changing the conventional device 20, the network control device 10 can cope with the operation of an extended device and an extended screen by only transmission and reception of a simple command using serial communication.

Figure 4:
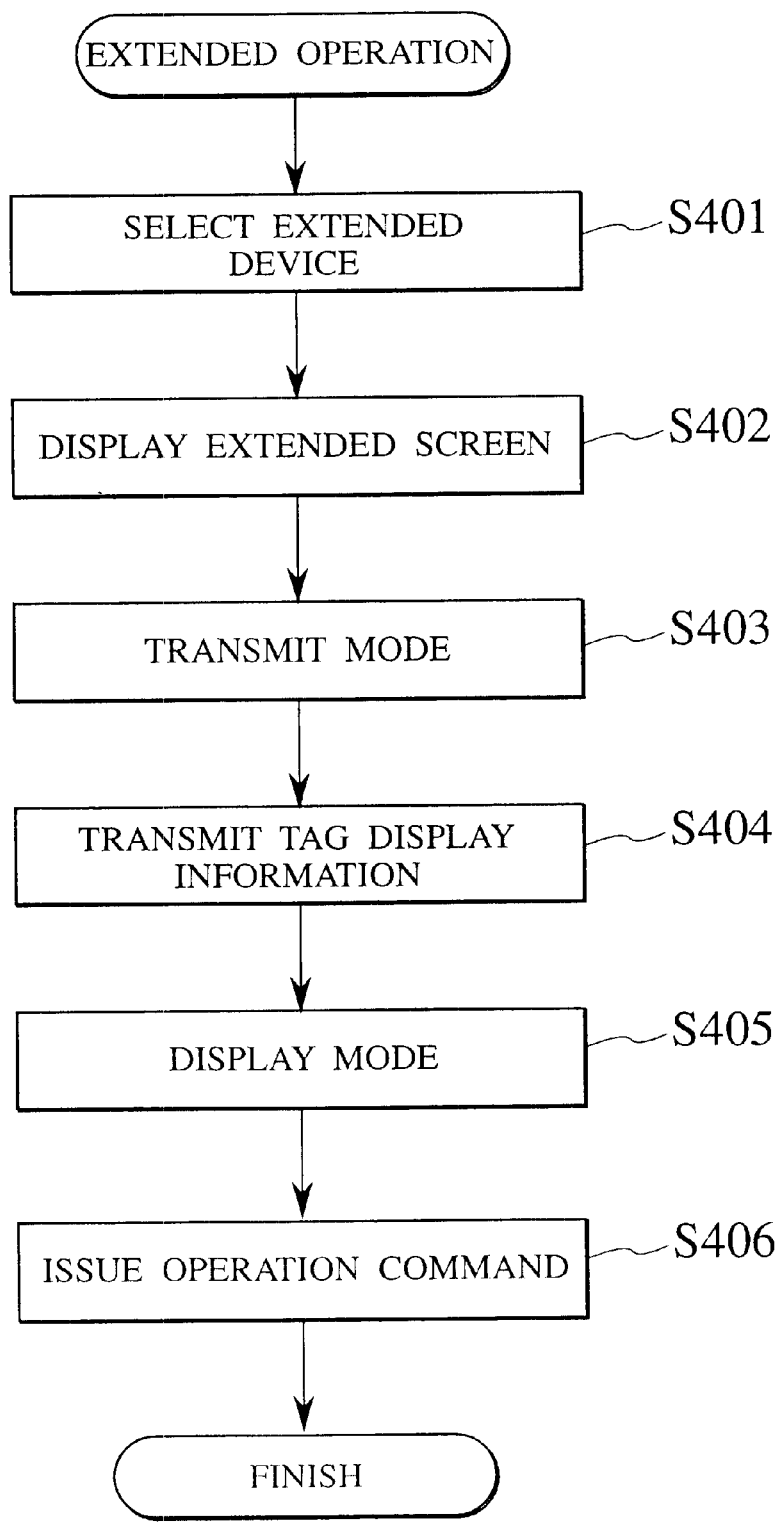
FIG. 4 is a flow chart showing a method of extending a network using the network control device according to the embodiment of the present invention.

When a device (extended device) in the additional network system B is operated in the network control device 10 of the embodiment of the present invention, as shown in FIG. 4, following steps are performed.

(1) First, an extended device in the network system B operated by a switching input (SW) of the conventional device 20 is selected(extended device selection step, S401).
(2) The conventional device 20 displays an extended screen (extended screen display step, S402).
(3) Subsequently, the conventional device 20 transmits a desired operation mode to the network control device 10 (mode transmission step, S403).
(4) The network control device 10 transmits information displayed as a tag of the extended screen to the conventional device 20(tag display information transmission step, S404).
(5) The conventional device 20 displays a required operation mode on the extended screen(mode display step, S405).
(6) The network control device issues an operation command for instructing an operation required by the extended device in the network(operation command issue step, S406).

In this manner, for example, when the DVD device 25 on the network system B is used as an extended device, the DVD device 25 can be operated by a switching (SW) unit in the device 20 in the conventional network system A. When a monitor is arranged on the network system, an operation guide for buttons can also be displayed as an extended screen.

OTHER EMBODIMENTS

Various modifications will become possible for those skilled in the art after receiving the teachings of the present disclosure without depending from the scope thereof.

As described above, the present invention includes various embodiments which are not described here, as a matter of course. Therefore, the spirit and scope of the present invention are determined by the following claims which are appropriate according to the above description.

What is claimed is:

1. A network control device comprising:

network control unit for controlling a communication process in a first network system;

a serial interface for controlling a serial communication process between the first network system and a second network system; and initializing unit for updating a communication program of the second network system, wherein the initializing unit comprises:
  mode switching unit for switching changeable/unchangeable of the communication program of the second network system; and
  program download unit for transmitting the communication program to the second network system.

2. The network control device of claim 1, further comprising:
  a communication interface for controlling an inputting/outputting operation of a signal from the first network system.

3. The network control device of claim 2, further comprising:
  an A/D and D/A converter for performing an analog/digital and digital/analog conversion process of communication information.

4. The network control device of claim 3, wherein said device enables
  communication between the first network and the second network without using a conventional device with a gateway function.

5. The network control device of claim 4, wherein said device enables
  communication between the first network and the second network, without changing a conventional device in the second network.

6. The network control device of claim 3, wherein said device enables
  communication between the first network and the second network, without changing a conventional device in the second network.

7. The network control device of claim 2, wherein said device enables
  communication between the first network and the second network without using a conventional device with a gateway function.

8. The network control device of claim 7, wherein said device enables
  communication between the first network and the second network, without changing a conventional device in the second network.

9. The network control device of claim 2, wherein said device enables
  communication between the first network and the second network, without changing a conventional device in the second network.

10. The network control device of claim 1, further comprising:
  an A/D and D/A converter for performing an analog/digital and digital/analog conversion process of communication information.

11. The network control device of claim 10, wherein said device enables
  communication between the first network and the second network without using a conventional device with a gateway function.

12. The network control device of claim 10, wherein said device enables
  communication between the first network and the second network, without changing a conventional device in the second network.

13. The network control device of claim 10, wherein said device enables
  communication between the first network and the second network, without changing a conventional device in the second network.

14. The network control device of claim 1, wherein said device is enables the first and the second network without using a coventional device with a gateway function communication between the first and the second network without using a coventional device with a gateway function.

15. The network control device of claim 14, wherein said device enables
  communication between the first network and the second network, without changing a conventional device in the second network.

16. The network control device of claim 1, wherein said device enables
  communication between the first network and the second network, without changing a conventional device in the second network.

* * * * *

UNITED STATES PATENT AND TRADEMARK OFFICE
CERTIFICATE OF CORRECTION

PATENT NO. : 6,640,254 B1
DATED : October 28, 2003
INVENTOR(S) : Satoshi Tanaka et al.

It is certified that error appears in the above-identified patent and that said Letters Patent is hereby corrected as shown below:

<u>Column 6,</u>
Line 27, delete "is"
Lines 27-28, delete "the first and the second network without using a coventional device with a gateway function"
Line 30, change "conventional" to -- conventional --

Signed and Sealed this

Twenty-seventh Day of April, 2004

JON W. DUDAS
*Acting Director of the United States Patent and Trademark Office*